US010527418B2

(12) United States Patent
Clifford et al.

(10) Patent No.: US 10,527,418 B2
(45) Date of Patent: Jan. 7, 2020

(54) ROTATABLE GPS COMPASS AND METHOD

(71) Applicant: Multiwave Sensors Inc., Brampton (CA)

(72) Inventors: Bruce Kenneth Clifford, Brampton (CA); Mark Frischman, Thornhill (CA); Michael Robb Main, Aurora (CA)

(*) Notice: Subject to any disclaimer, the term of this patent is extended or adjusted under 35 U.S.C. 154(b) by 704 days.

(21) Appl. No.: 14/466,872

(22) Filed: Aug. 22, 2014

(65) Prior Publication Data
US 2015/0054681 A1 Feb. 26, 2015

Related U.S. Application Data

(60) Provisional application No. 61/868,884, filed on Aug. 22, 2013.

(51) Int. Cl.
*G01C 17/00* (2006.01)
*H01Q 1/22* (2006.01)
*G01S 19/39* (2010.01)
*H01Q 1/12* (2006.01)
*G01S 19/14* (2010.01)
*G01S 19/53* (2010.01)

(52) U.S. Cl.
CPC .......... *G01C 17/00* (2013.01); *G01S 19/14* (2013.01); *G01S 19/39* (2013.01); *G01S 19/53* (2013.01); *H01Q 1/125* (2013.01); *H01Q 1/22* (2013.01); *Y10T 29/49018* (2015.01); *Y10T 74/20654* (2015.01)

(58) Field of Classification Search
CPC ......... G01C 17/00; G01S 19/14; G01S 19/39; G01S 19/53; H01Q 1/125; H01Q 1/22; Y10T 74/20654; Y01T 29/49018

USPC .................................................. 343/805, 915
See application file for complete search history.

(56) References Cited

U.S. PATENT DOCUMENTS

| | | | | |
|---|---|---|---|---|
| 1,745,096 A * | 1/1930 | Jayne | ....................... | H01Q 1/46 174/105 R |
| 2,604,593 A * | 7/1952 | Trowbridge | ............. | H01Q 9/12 343/805 |
| 4,758,840 A * | 7/1988 | Dardenne | .............. | H01Q 1/125 342/359 |
| 5,341,149 A * | 8/1994 | Valimaa | .................... | H01Q 1/40 29/600 |
| 6,380,900 B1 * | 4/2002 | Kanayama | ............. | H01Q 1/243 343/702 |

FOREIGN PATENT DOCUMENTS

EP          0899752 A1 *   1/1999

* cited by examiner

*Primary Examiner* — Frank J McGue
(74) *Attorney, Agent, or Firm* — Eugene J. A. Cierczak; Miller Thompson, LLP

(57) ABSTRACT

This invention relates to a rotatable device having two arms rotatably connected about a hollow hub wherein the arms include a cable extending through a passageway and the hub so as to minimize bending of the cables about each other when the arms are in a compact position. In particular this invention relates to a foldable GPS compass and a method relating thereto to present a compact folded device that is easier to install with minimal bending of the cables. The invention also discloses a detent disposed within the hub for accurate selective placement of the arms and method relating thereto.

15 Claims, 8 Drawing Sheets

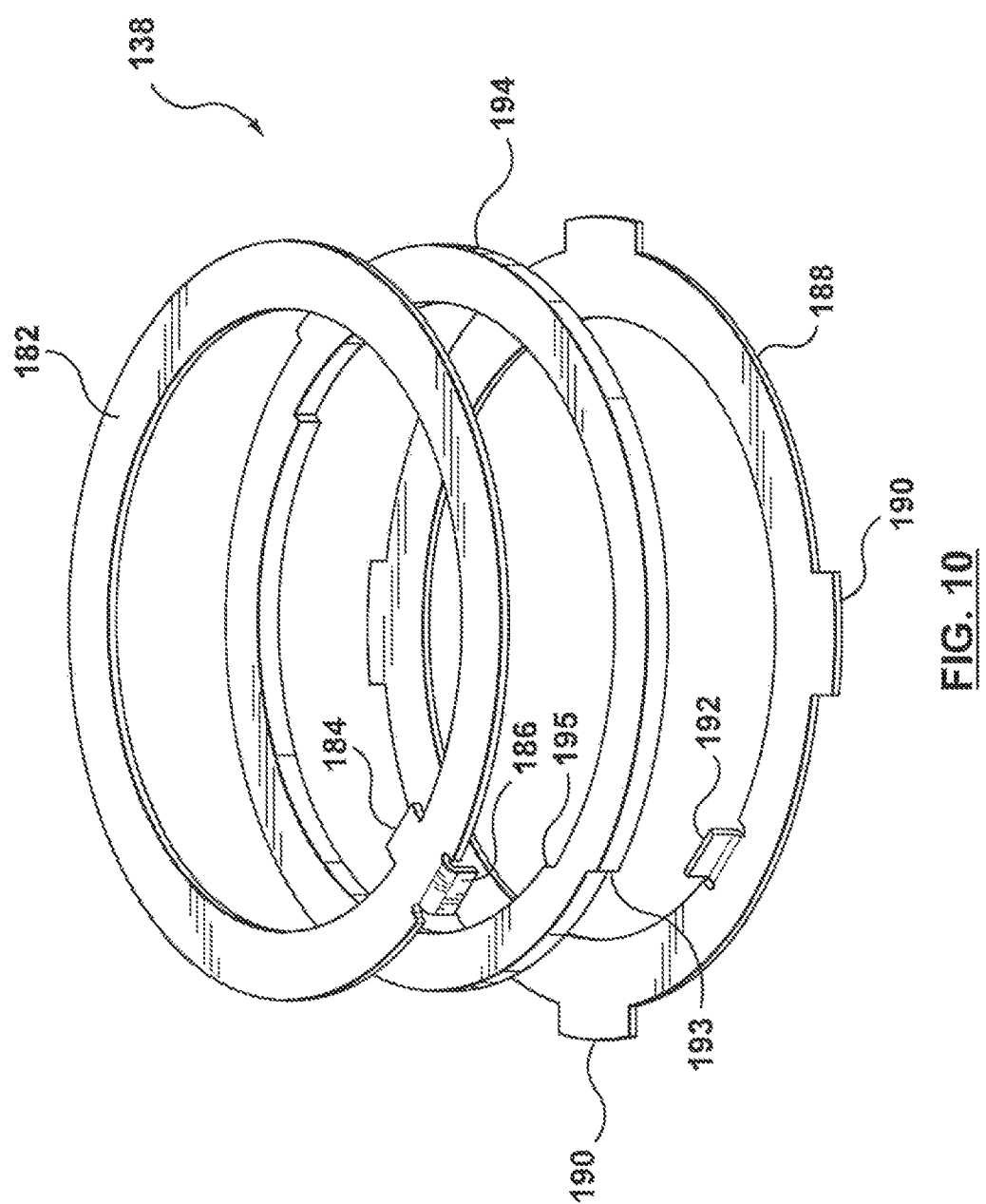

ROTATABLE GPS COMPASS AND METHOD

FIELD OF INVENTION

This invention relates to a rotatable device having two arms rotatably connected about a hub wherein the arms include a cable extending through a passageway and the hub so as to minimize bending of the cables when the arms are displaced from a compact to an extended position. In particular this invention relates to a foldable GPS compass and a method relating thereto to present a compact folded device that is easier to install with minimal bending of the GPS antenna cables. The invention also discloses a detent device disposed within the hub for accurate selective placement of the arms and method relating thereto.

BACKGROUND TO THE INVENTION

Wireless communications enable information to be exchanged using wireless devices, such as cellular telephones and Internet-enabled smart phones. With the ever-increasing demand for wireless bandwidth, it is becoming increasingly important to ensure that wireless networks are optimally deployed.

Typically, wireless communication networks comprise a plurality of telecommunications antenna mounted high above antenna masts, transmission towers, and tall buildings. Each antenna is typically a panel antenna designed to serve a specific area, which in the case of cellular communications is referred to as a cell. The strength of the signal available to wireless devices within the cell is in part based on the precision of the installation of the antenna.

To optimize the strength and bandwidth of the signal, the panel antenna must be properly aligned when it is installed. Due to wind and movement during servicing, the antenna must also be realigned from time to time. Alignment involves both pointing the antenna at a particular azimuth and at a particular mechanical tilt. Even small errors in the azimuth alignment will cause a significant degradation in signal quality. Mechanical tilt errors are not as critical since a mechanical tilt error is typically controlled electronically as well as mechanically.

A multitude of prior art solutions are currently in use for azimuth alignment of panel antenna. Currently, the most accurate alignment apparatus are those that are mounted directly to the antenna during installation and servicing.

Sunsight™ is the manufacturer of one such system that can be mounted either to the side or top of the antenna. The Sunsight system includes GPS antenna that are used to determine the azimuth of the panel antenna to be aligned.

UMTS Project Partners is another manufacturer of an alignment system called the SPAA-05 (trademark). FIG. 2 illustrates a SPAA alignment system. This system comes closer to measuring an accurate azimuth than the Sunsight system. It includes two arms, one of which braces the back panel of the antenna and the other which braces the front panel of the antenna. An arm configured to hold an electronic pointing system extends from the front arm. However, the shape and configuration of antenna cause a problem for the SPAA to provide precise alignment.

Another antenna alignment system is manufactured 3Z Telecom which systems are more fully particularized in www.3ztelecom.com/antenna-alignent-tool/

One of the difficulties from such prior art devices relates to the size of the alignment systems. Generally speaking, a technician sometimes called a tower dog needs to climb a tower while carrying equipment to do man tasks with respect to the antenna. Therefore, if the size of these devices could be made smaller, they would be easier to deploy.

It the equipment could be made smaller, this would not only help carry the equipment up a tower but also with shipping, the ability to hand carry the system back and forth as well as being able to bring it onto an airplane as carry-on luggage.

One approach taken by the prior art relates to using board sets from Hemispheres as outlined in their data sheets. However, these prior art systems are not that accurate as the antennas are generally less than 0.5 meters apart.

Another arrangement in the prior art is disclosed by Watson Industries, Inc. from Wisconsin, U.S.A. at www-.watson-gyro.com relating to foldable GPS antennas that are stowed in a container bearing model number GGC-E101.

Accordingly, there is a need to develop a system that is more compact and accurate than the prior art. However, the prior art devices require two spaced antennas that are generally 0.5 meters apart which antennas require cabling to central processing electronics. Furthermore, it is not advisable to utilize cables that are exposed to the environment or expose the cables to excessive bending.

Therefore, there is a need to produce an articulated GPS compass that is foldable in a stacked position and that extends in an extended position.

There have been some devices that illustrate articulated folding structures and methods. For example, U.S. Pat. No. 7,097,133 teaches an articulated wing which is readily deployable from a stowed configuration that occupies minimal volume to an extended configuration for flight. However, the cables utilized in this structure bends upon itself and is not suitable for a GPS compass system as the bending of the cables will affect the accuracy of the antennas. Another foldable device is demonstrated in U.S. Pat. No. 6,343,442 that relates to a flattenable foldable boom hinge.

It is an object of this invention to provide a further improved foldable device which substantially eliminates the folding of the cable upon itself when the device is moved from its compact stacked position to an extended selectively rotatable position.

It is another object of this invention to provide an improved foldable GPS compass which is easier to install and adjust.

One aspect of the invention relates to a displaceable device comprising: at least two segments rotatable about a hollow cylinder between: a first composition and a second extended position; wherein one of said segments includes a passageway communicating with said hollow cylinder; and a cable extending through this passageway of one of the segments through the hollow cylinder, when the segments are rotated between the first compact position to the second extended position.

It is another aspect of the invention to provide a rotatable GPS compass comprising: first and second arms rotatably connected at one end thereof and defining a hub rotatable between: a compact position where said first and second arms overlie each other; to an extended position with said first and second arms disposed along a first direction; the first arm carrying a first antenna at another end of the first arm; the second arm carrying a second antenna at another end of the second arm; first and second arms including a passageway communicating with the hub; one cable extending from the first antenna through the passageway of the first arm to the hub; another cable extending from the second antenna through the passageway of the second arm to the hub; wherein the first and second cables are subjected to torsional movement between the compact and extended positions. In one embodiment the arms and the antennas are selectively rotatable about preset positions relative an azimuth direction.

Yet another aspect of the invention relates to a detent for selectively positioning a member comprising first and second discs where one of said discs includes recess means and the other disc includes a moveable pair of engageable gear protrusions adapted to engage said recess means at preselected positions.

A further aspect of the invention relates to a method of installing a GPS compass onto an antenna tower comprising: moving a segmented GPS compass into a compact position; connecting one end of the compact GPS compass onto the antenna tower extending the segmented GPS compass so that each of the segments are in a selected direction.

BRIEF DESCRIPTION OF THE DRAWINGS

FIG. 10 is an exploded view of the stacked rings of FIG. 8.

DETAILED DESCRIPTION OF THE INVENTION

Figure 1:
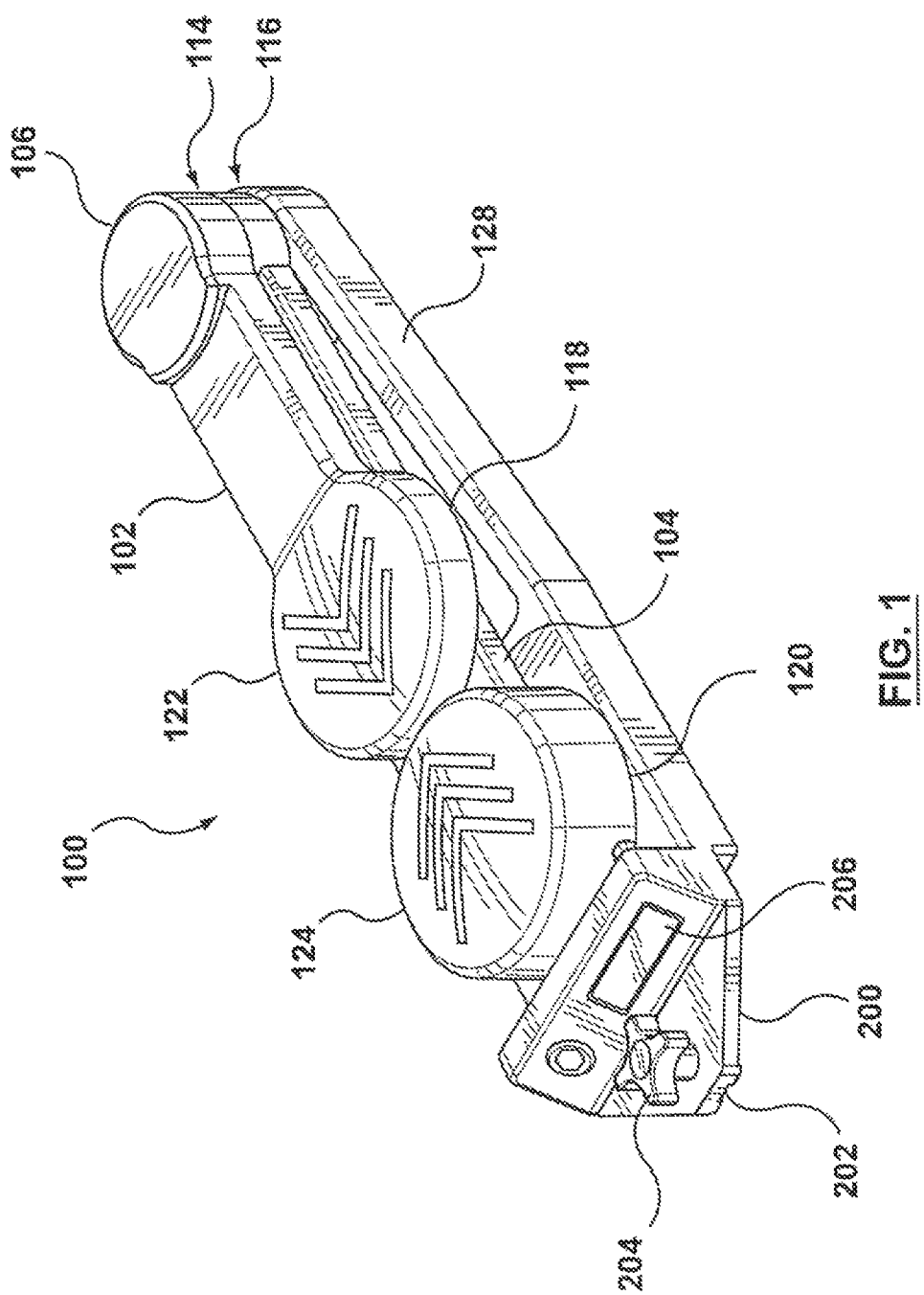
FIG. 1 is a top perspective view of the rotatable GPS system in a compact position.
Figure 2:
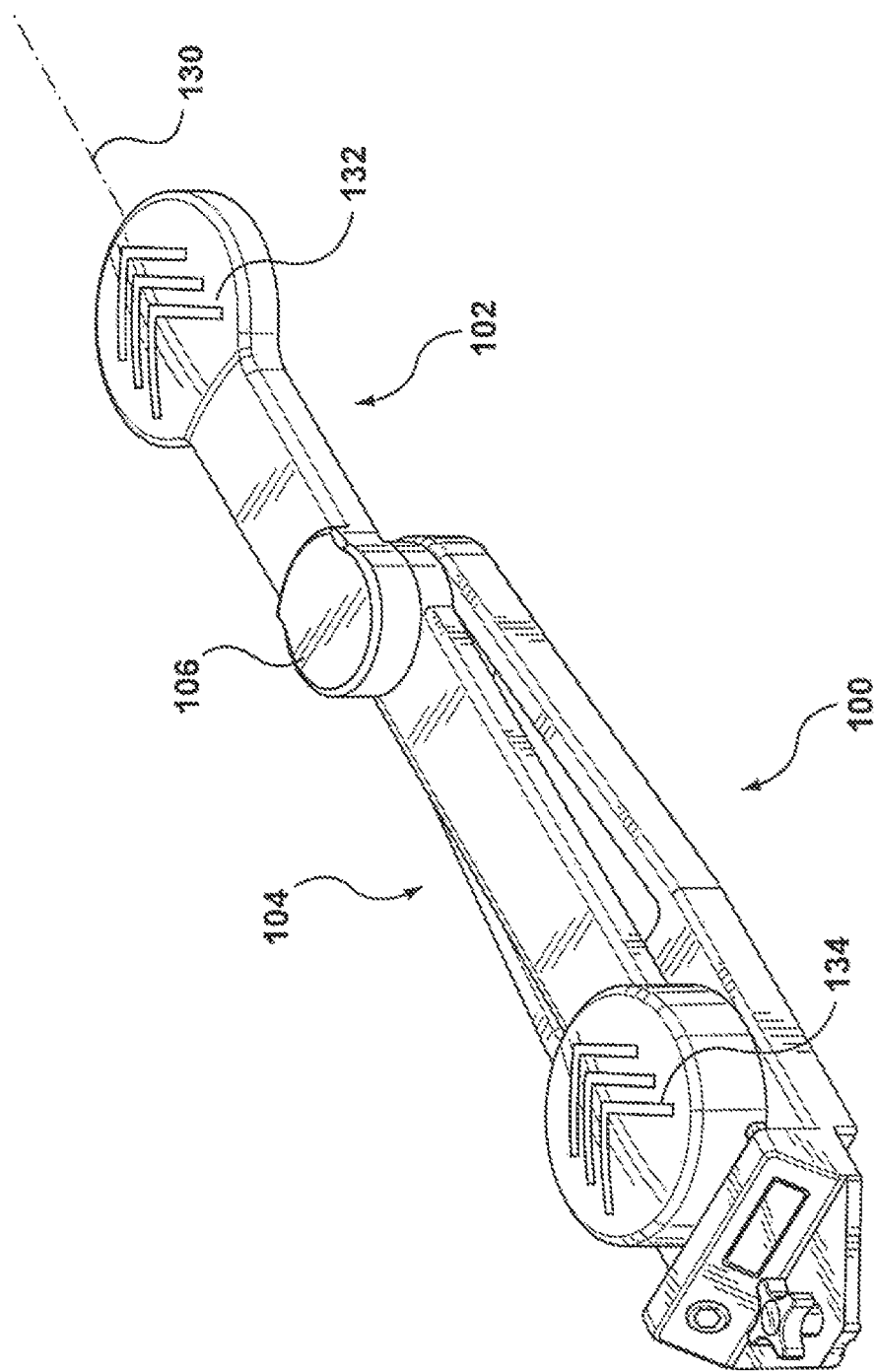
FIG. 2 is a perspective view of the GPS system in an extended position.

FIGS. 1 and 2 generally describe a rotatable device 2 in a compact and extended position, respectively that comprises a first and second arm or segment 102 and 104. The first and second arm or segment 102 and 104 rotate about each other and in particular rotate about a hollow cylinder or hub 106 between a first compact or stored position as shown in FIG. 1 and a second extended position as shown in FIG. 2.

Figure 7:
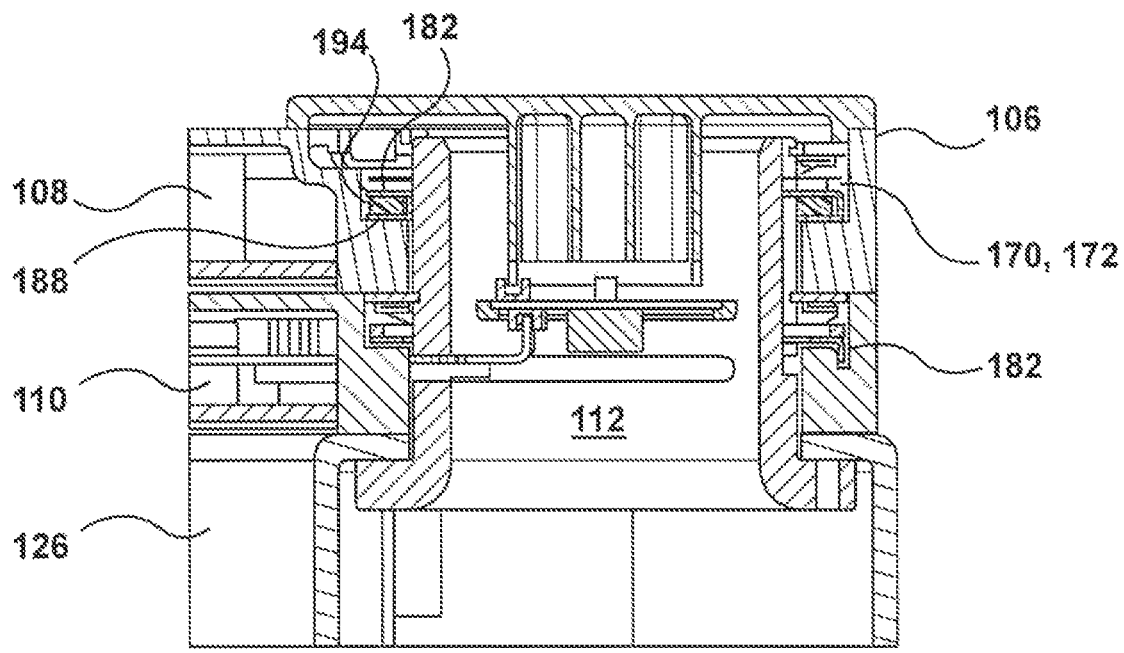
FIG. 7 is a cross-sectional view along the lines A-A of FIG. 5 through the hub.

The first and second arms 102 and 104 are hollow and include passageways 108 and 110 as best seen in FIG. 7 which communicate with space 112 in hub 106.

A cable extends through the passageway 108 of one of the segments 102 through the hollow cylinder or hub 106 when the segments 108 and 110 are rotated between the first compact position as shown in FIG. 1 and the second extended position shown in FIG. 2. The first and second arms 102 and 104 are substantially parallel to one another and stacked in the first compact position.

A first arm 102 has one end 114 connected to the hub 106 and the second arm 104 has one end 116 rotatably connected to the hub 106. Another end 118 of the first arm 102 includes a first or primary antenna 118 while the second arm 104 presents a second or secondary antenna at another end 120.

There is one cable that extends from the first antenna 122 through the passageway 108 to the hub 106. Another cable extends from the second antenna 124 through the passageway 110 of the second arm 104 with the hub 106.

The first and second cables are subjected to torsional movement when the foldable device 100 is moved between the compact and extended positions. The cables in one embodiment are coiled within the space 112 of hub 6 and extended back through a passageway 126 presented by the extension 128.

Accordingly the rotatable GPS compass 100 presents a first and second arm 102 and 104 which are stacked one upon the other in the compact position and where the first and second arms 102 and 104 extend in a first linear or azimuth direction 130. Arms 102 and 104 include indicia 132 and 134 comprising arrows that point to the azimuth direction 130.

The rotatability of the arms 102 and 104 reduce the size of storage and shipping of the device 100. The rotation or articulation of the device 100 has a number of pre-selected positions which shall be described herein.

During articulation of the segments or arms 102 and 104 from the compact position to the extended position the cable is subjected a "torsional" (i.e. twisting or rotating about an axis) movement, namely torsional load, or torsional bending between the compact and extended positions. If the cable was bent back and forth upon itself it would impact on the accuracy of the system because of the degradation of the cable. The design described herein minimizes the degradation of the cables.

Furthermore, the arms 102 and 104 cover the cable. In other words, the cable is not exposed to the environment and thereby ensures a long lasting reliable accurate system.

Moreover the hub 106 is disposed between the first and second arms 102 and 104 in the extended position.

Figure 3:
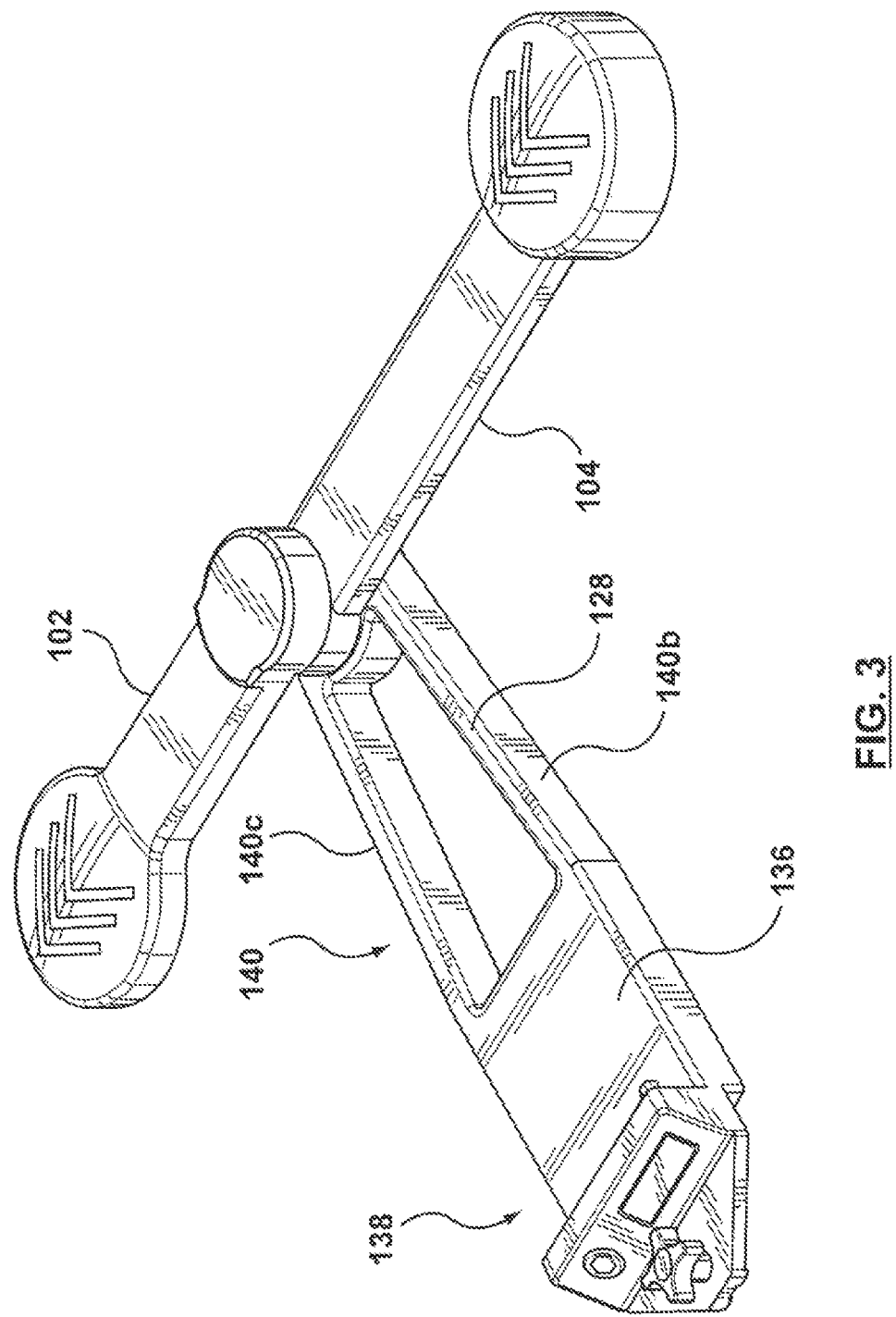
FIG. 3 is a top perspective view of the rotatable GPS compass in a selected rotated left position namely −90 degrees to the antenna.

The first and second arms 102 and 104 and hub 106 are carried by an extension 128 that includes at one end thereof the hub 106 and at another end thereof the housing 136 for placement or housing of a control circuits at another end 138 of the extension 128. The extension 128 includes at least one passageway or channel 140 which communicate with the hub so that the cables can extend from the hub 106 to the control means 138 by means of the passageways 140. In one embodiment as shown in FIG. 3 there are two passageways 140a and 140b which accommodate each of the cables that extend from the first and second antennas 122 and 124 through the passageways 108 and 110 into the space 112 of hub 106 toward the control means 136. In one embodiment the antennas 122 and 124 are spaced 0.5 metres from one another although different dimensions can be utilized within the scope of the invention.

During articulation of the foldable GPS compass, the first and second cables are subjected to torsional and or flexing movement. In one embodiment the cables are coiled within the hub 106 thereby prevention or minimizing degradation of the cables due to bending, or flexing.

FIG. 3 illustrates that the GPS compass 100 in the extended position can be rotated or displaced through a left position as shown which according to the azimuth direction 130 represents −90 degree to the antenna.

Figure 4:
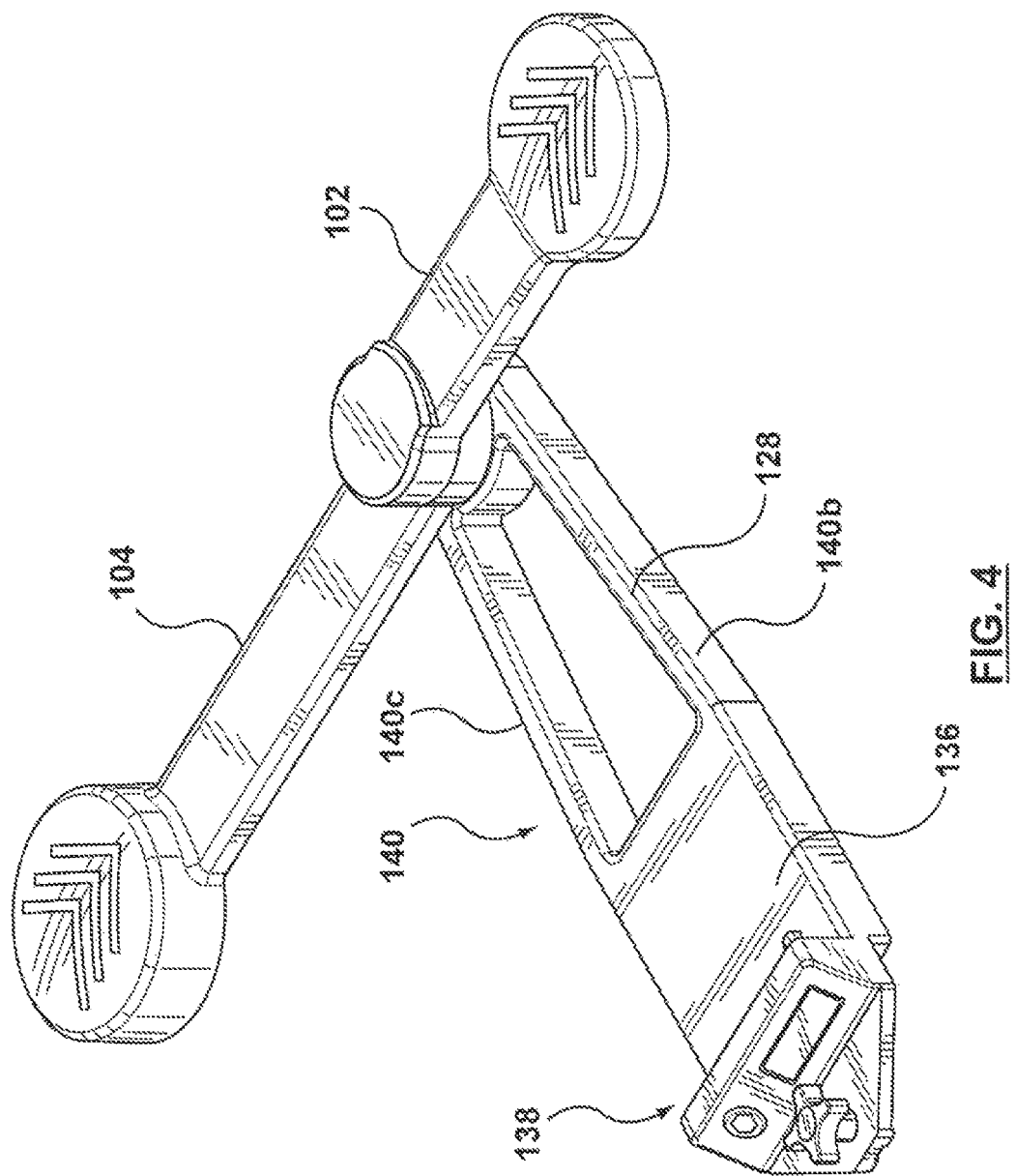
FIG. 4 is a top perspective view of the rotatable GPS compass in an extended selected rotated right position namely +90 degrees to the antenna.
Figure 5:
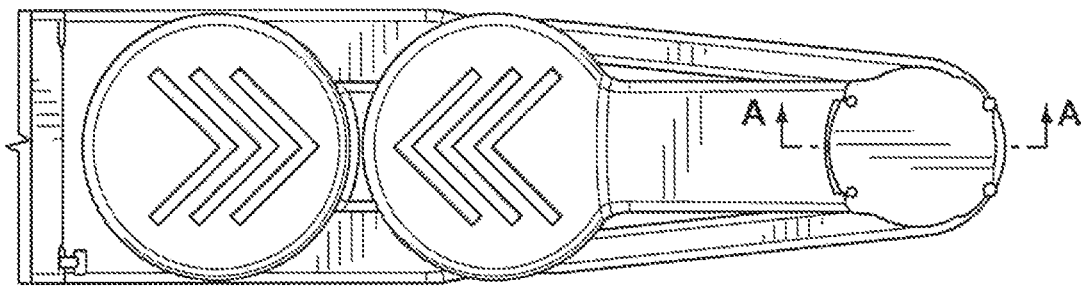
FIG. 5 is a top plan view of the rotatable GPS compass in a compact, stored position.
Figure 6:
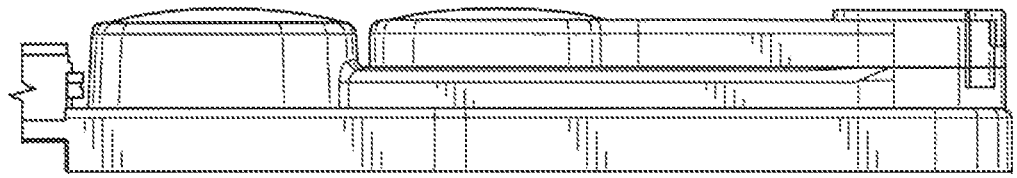
FIG. 6 is a side elevational view of FIG. 5.

FIG. 4 illustrates that the GPS compass in the extended right position can be rotated or displaced +90 degrees to the antenna relative to the azimuth direction.

Figure 8:
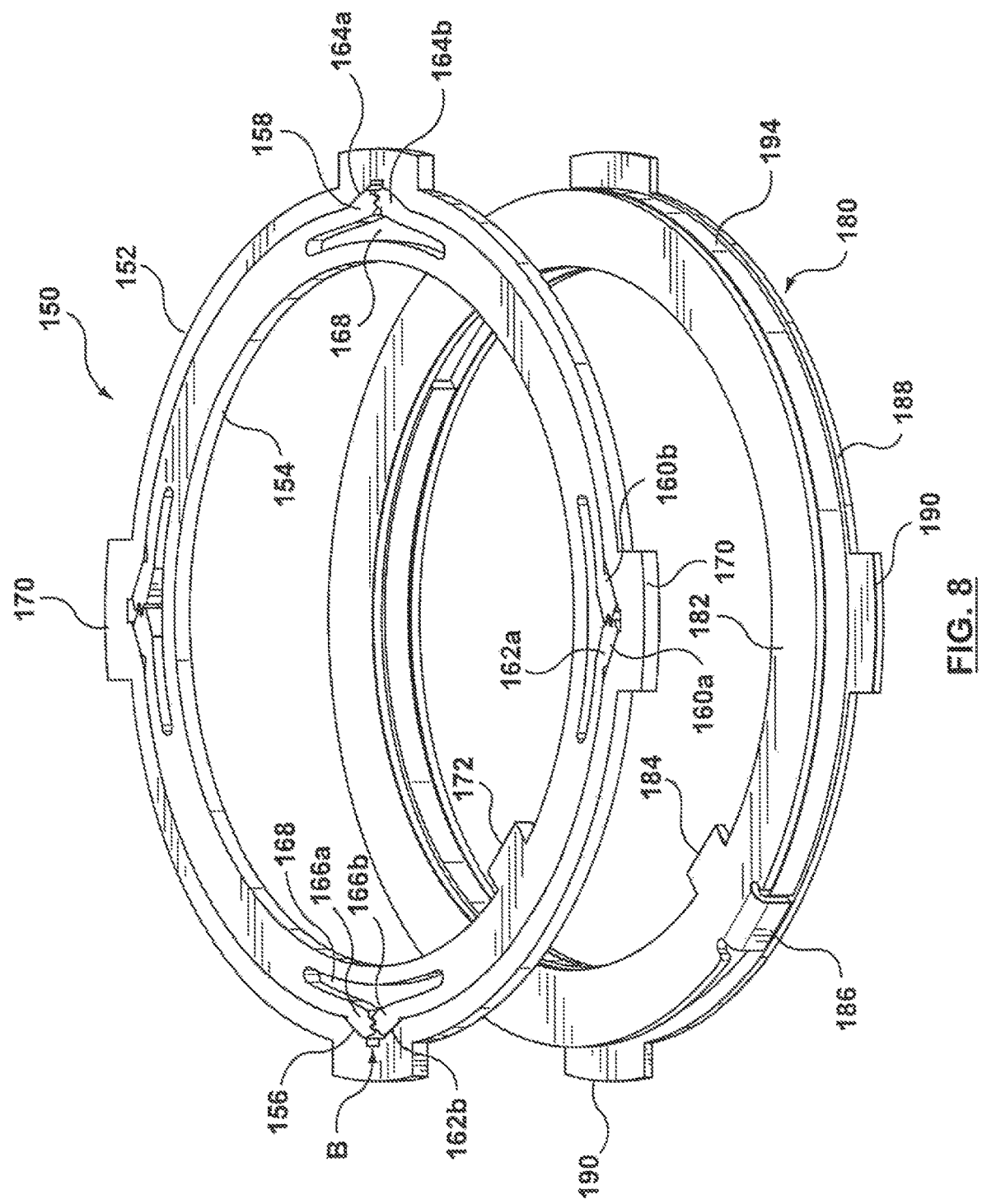
FIG. 8 is a perspective view showing detent rings or discs and stacked rings having stop means.
Figure 9:
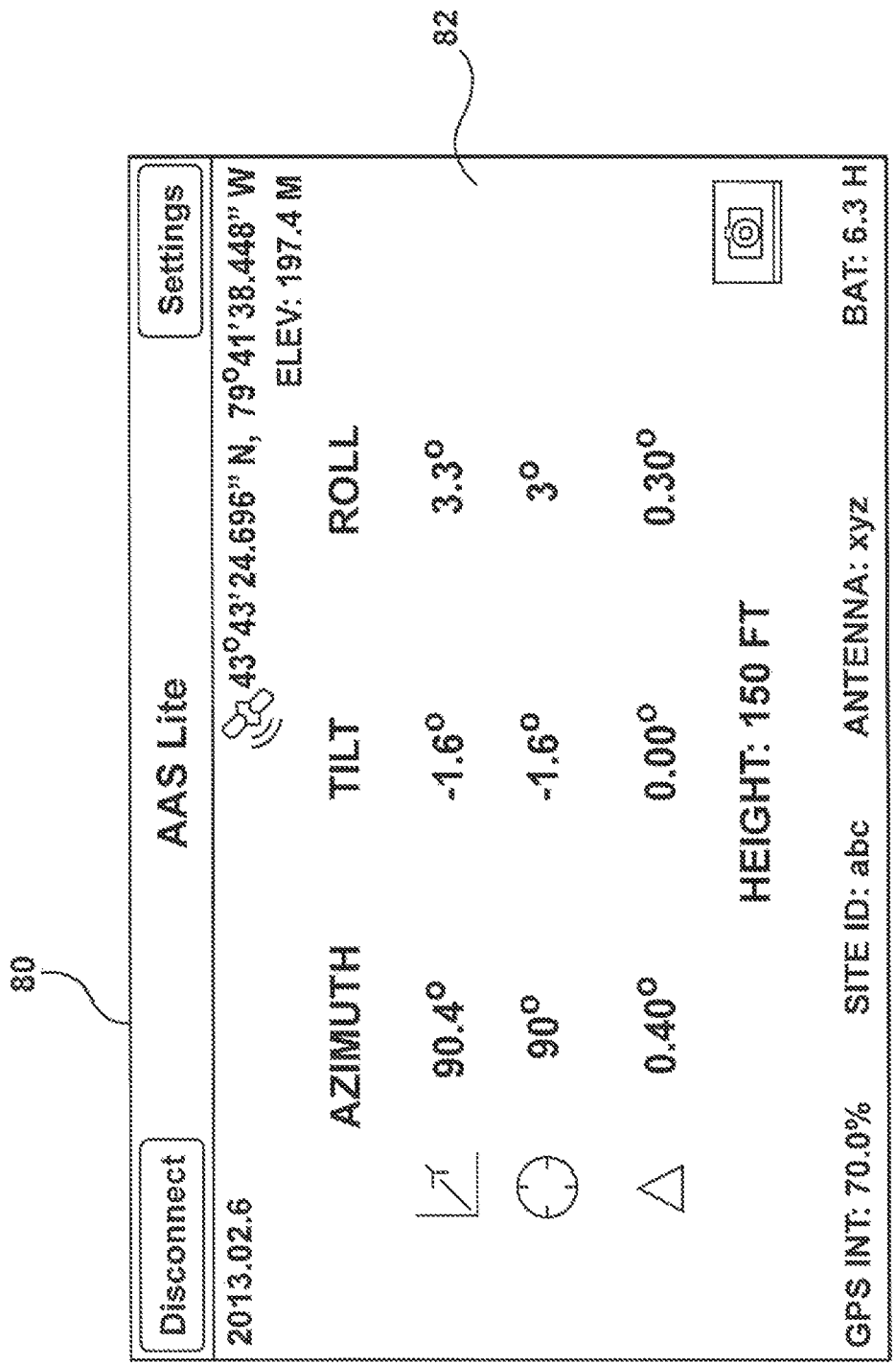
FIG. 9 is a view of a display.

In order to securely place or position the antenna into the desired orientations the GPS antenna 100 includes herewith a detent means 150 which in one embodiment can comprise first and second concentric annular rings or discs 152 and 154. One of the discs 152 and 154 includes recess means 156 while the other disc 154 includes moveable extension means 158 adapted to engage the recess means 156. The recess means 156 and extension means 158 can be disposed at 90 degree increments as shown in FIG. 8. However other orientations are possible within the scope of the invention as described herein. In another embodiment the recess means 156 could be molded into the arms 102,104.

More particularly the recess means 156 can comprise sloped surfaces 160a and 160b that permit corresponding sloped surfaces 162a and 162b of extension means 150a to ride against. In one embodiment the extension means 158 include fingers or extensions 164a and 164b that include a pair of engaged gear protrusions 166a and 166b that are adapted to engage one another as the protrusion 164a and 164b flex inwardly towards space 168 as the fingers or extensions 164a and 164b are pushed into the direction of arrow B. One of the rings 152 will be stationary within the hub 106 while another ring 154 is adapted to rotate relative to the other ring 150. In one embodiment the ring 152 includes a plurality of stops 170 for placement within the space 112. The moveable ring or disc 154 also includes an extension 172 which engages an appropriate stop within the housing 106 so that the disc or ring 154 has a limited rotational orbit within the space 112. In other words the first and second arms 102 and 104 are designed to move to the position as shown in FIGS. 1, 2, 3, and 4 with the assistance of the detent means 150 as described above. The stops prevent the GPS compass 100 from over rotating, which would create excessive rotating of the cables within the hub 106. More particularly the stop means establishes limits on the flexing of the cables and ensures the arms 102,104 are returned to the stowed or compact position by rotating in the opposite direction to where it is extended.

The rotational GPS compass 100 illustrates that one of the arms 102 and 104 includes another annular disc 180 disclosed in the hub 106 which includes a stop means engageable with an annular groove presented by one of the arms for selectively positioning the arm in an pre-selected position. The other arm includes a plurality of stacked annular discs carrying stop means for selectively positioning the other arm in preselected positions.

More particularly the shorter arm 102 includes a three washer or disc stack 180 which are concentrically disposed about an axis of rotation in hub 106. A top washer or disc 182 has at least one inward pointing key way tang 184 and an outer downward bent interlock tang 186 that engages with appropriate surfaces within the hub 106 as shown. Furthermore the tang 186 when rotated engages the stop 193 of interstitial ring 194 during rotation. Furthermore rotation of the interstitial ring 194 will present stop edge 195 to engage tang 192. The stacked rings can rotate clockwise or counterclockwise. A bottom annular disc or washer 188 includes four outwardly facing arm body tabs 190 and one inner upward bent interlocking tang 192.

The other arm 104 or long arm includes another washer or disc 196. The disc 196 includes outer downward bent interlock tang 186 which will ride in a groove in the arm body and will stop at either end of the groove that represents the limits of the orbital swing of the device as shown in FIGS. 1, 2, 3, and 4.

The extension 128 includes a connecting flange 200 which can be used to connect the GPS compass to an antenna. For example the flange 200 can be connected to applicant's connecting device or universal bracket as described in U.S. patent application Ser. No. 13/059,865. The flange 200 includes channel 202 to connect with channels located on the connecting device disclosed in the U.S. patent application Ser. No. 13/059,865 so that the GPS compass can be utilized to connect the GPS compass 100.

In particular, the Universal Bracket or connecting device disclosed in U.S. patent application Ser. No. 13/059,805 can be disposed at different angles, for example at 90 degrees to one another to orient the device at different intervals of, for example, 90 degrees. The mating grooves in the Universal Bracket has multiple grooves that allow forward, side and rear-facing surveys. The fastening means 204 locks two plates together during the survey. Such orientation is taken into account by the control means 136 as well as a display 206.

A portable receiving device 80 includes means for sending a wireless signal to the control means 136 to adjust at least one of the azimuth, tilt and row positions of the antenna.

The invention as described herein relates to a method of installing GPS compass 100 onto an antenna (not shown) comprising:
(a) moving a segmented GPS compass into a compact position;
(b) connecting one end of the compact GPS compass onto an antenna tower; and
(c) rotatably extending the segments and GPS compass so that each of the segments are in an azimuth direction.

The method also includes activating the wireless communication means 50 carried by the extended GPS compass 100 so as to communicate with a portable device 80. The portable device 80 can be utilized to adjust the azimuth, tilt and/or roll of the antenna by communicating with the wireless communicating device.

The structural elements of the GPS compass can comprise of a number of materials such as aluminum or the like. The material covering the antenna elements 122 and 124 must permit radiation in order for the satellite signal to be received by the GPS antenna elements underneath. In one embodiment the material can comprise of polycarbonate or other plastic that does not block RF signals. Furthermore the interstitial annular ring can be made from a variety of materials including plastic or the like.

We claim:
1. A rotatable GPS compass comprising:
(a) a housing comprising a first arm and a second arm, the first arm of a first fixed length and the second arm of a second fixed length, each of said first and second arms rotatably connected at one end thereof to a hub, and rotatable between:
(i) a compact position where said first and second arms overlie each other to
(ii) an extended position where said first and second arms are disposed along a first direction;
(b) the first arm carrying a first antenna at another end of the first arm;
(c) the second arm carrying a second antenna at another end of the second arm;
(d) the first and second arms including a passageway communicating with the hub;
(e) one cable extending from the first antenna through the passageway of the first arm to the hub;
(f) another cable extending from the second antenna through the passageway of the second arm to the hub;
(g) wherein the first and second cables are coiled within said hub so as to minimize torsional movement between the compact and extended positions.

2. A rotatable GPS compass comprising:
(a) a first arm of a first fixed length and a second arm of a second fixed length rotatably connected at one end thereof to a hub, and rotatable between:
  (i) a compact position where said first and second arms overlie each other; to
  (ii) an extended position where said first and second arms are disposed along a first direction;
(b) the first arm carrying a first antenna at another end of the first arm;
(c) the second arm carrying a second antenna at another end of the second arm;
(d) the first and second arms including a passageway communicating with the hub;
(e) one cable extending from the first antenna through the passageway of the first arm to the hub;
(f) another cable extending from the second antenna through the passageway of the second arm to the hub;
(g) wherein the first and second cables are coiled within said hub so as to minimize torsional movement between the compact and extended positions;
(h) an extension for housing control means at one end thereof and to present the hub at another end thereof;
(i) the first fixed length of said first arm is shorter than said second fixed length of said second arm so that said first and second arms are stacked upon one another in the compact position, and;
(j) the first and second arms extend in a first linear direction in to the extended position.

3. The rotatable GPS compass as claimed in claim 2 wherein the first and second arms and said extension are stacked one upon each other in the compact position, and said first and second arms include indicia that point to the first linear direction that defines an azimuth direction; and wherein said first and second arms are rotatable only in one plane.

4. The rotatable GPS compass as claimed in claim 3 wherein the first antenna comprises a primary antenna.

5. The rotatable GPS compass as claimed in claim 4 wherein said second antenna comprises a secondary antenna.

6. The rotatable GPS compass as claimed in claim 4 wherein at least one of said arms includes detent means and disposed in said hub where said detent means comprise first and second annular discs where one of said discs includes recess means and the other disc includes moveable extension means to engage said recess means.

7. The rotatable GPS compass as claimed in claim 3 wherein one of said arms includes at least one annular disc disposed in said hub including a detent means engageable with an annular groove presented by one of said arms so that said first and second arms rotatably move together to a plurality of pre-selected positions.

8. The rotatable GPS compass as claimed in claim 7 wherein said other arm includes a plurality of stacked annular discs carrying said detent means for selectively positioning said other arm in a pre-selected position.

9. The rotatable GPS compass as claimed in claim 8 wherein the extension includes means for attaching the foldable GPS compass onto an antenna tower; said attaching means comprising a bracket.

10. The rotatable GPS compass as claimed in claim 8 wherein one of said discs includes recess means and the other disc includes a moveable pair of engaged gear protrusions adapted to engage said recess means at pre-selected positions.

11. The rotatable GPS compass as claimed in claim 3 wherein said indicia comprises arrows.

12. A rotatable GPS compass comprising:
(a) a first arm of a first fixed length and a second arm of a second fixed length, where said first length of said first arm is shorter than the second fixed length of said second arm, said first and second arms connected at one end thereof to a hub having an axis of rotation for rotation of said first arm relative said second arm about said axis of rotation between:
  (i) a compact position where said first and second arms overlie each other to
  (ii) an extended position with said first and second arms disposed along an extended linear direction;
(b) the first arm carrying a first antenna at another end of the first arm;
(c) the second arm carrying a second antenna at another end of the second arm;
(d) whereby said first and second antennas are adjacent one another in said compact position, and where said first and second antennas are spaced apart from each other in said extended linear position;
(e) the first and second arms including a first and second passageway, respectively communicating with the hub;
(f) cable means extending from the first antenna through the passageway of the first arm to the hub and through the passageway of the second arm to the second antenna;
(g) wherein the cable means is coiled solely upon itself within said hub so as to minimize torsional movement between the compact and extended positions.

13. The rotatable GPS compass as claimed in claim 12 hereby said hub comprises detent means whereby said first and second arms rotate in said extended linear position to pre-selected positions.

14. The rotatable GPS compass as claimed in claim 13 wherein said first and second arms rotate in said extended linear position to pre-selected positions to define an azimuth direction, plus 90 degrees to the said azimuth direction, and minus 90 degrees to the said azimuth direction.

15. The rotatable GPS compass as claimed in claim 14 wherein said detent means comprise stop means to prevent over rotation of said first and second arms and said cable means, and wherein said first arm is rotatable only in a first plane and said second arm is rotatable only in a second plane, and said first and second planes are substantially parallel.

* * * * *